United States Patent
So

(10) Patent No.: US 7,430,371 B2
(45) Date of Patent: Sep. 30, 2008

(54) MOBILE COMMUNICATIONS TERMINAL FOR COMPENSATING AUTOMATIC EXPOSURE OF CAMERA AND METHOD THEREOF

(75) Inventor: Sun-Sang So, Jeollabuk-Do (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 11/366,554

(22) Filed: Mar. 3, 2006

(65) Prior Publication Data

US 2006/0198627 A1   Sep. 7, 2006

(30) Foreign Application Priority Data

Mar. 4, 2005   (KR) .................... 10-2005-0018256

(51) Int. Cl.
  *G03B 7/00*   (2006.01)
  *G03B 7/08*   (2006.01)
  *H04N 5/238*  (2006.01)

(52) U.S. Cl. .................. 396/234; 396/241; 348/364

(58) Field of Classification Search .............. 396/213, 396/233, 234, 236, 241; 348/221.1, 362, 348/364, 365
See application file for complete search history.

(56) References Cited

U.S. PATENT DOCUMENTS

| | | | |
|---|---|---|---|
| 5,703,644 A * | 12/1997 | Mori et al. ................. | 348/363 |
| 2004/0066464 A1 * | 4/2004 | Ueyama ..................... | 348/362 |
| 2005/0068428 A1 * | 3/2005 | Uchida ..................... | 348/231.3 |
| 2006/0062092 A1 * | 3/2006 | Ueyama ..................... | 369/30.01 |

* cited by examiner

*Primary Examiner*—Rodney E Fuller
(74) *Attorney, Agent, or Firm*—Birch, Stewart, Kolasch & Birch, LLP

(57) ABSTRACT

A method for compensating an automatic exposure of a camera in a mobile communication terminal. The method includes determining a presumptive error value based on an average luminance value of an input current image frame and a particular target luminance value, selecting a convergent coefficient value based on the determined presumptive error value, determining a weight value of an adaptive filter based on the determined convergent coefficient value, and determining an exposure value for a next image frame based on the selected weight value, the determined presumptive error value and the exposure value of the current image frame.

20 Claims, 5 Drawing Sheets

MOBILE COMMUNICATIONS TERMINAL FOR COMPENSATING AUTOMATIC EXPOSURE OF CAMERA AND METHOD THEREOF

BACKGROUND OF THE INVENTION

This application claims priority to Korean Application Number 10-2005-0018256 filed in Korea on Mar. 4, 2005, the entire contents of which is incorporated by reference in it entirety.

1. Field of the Invention

The present invention relates to a mobile communication terminal, and more particularly to a mobile communication terminal and method for compensating an automatic exposure of a camera to thereby shorten a time for the automatic exposure compensation and to improve the stability of the exposure compensation.

2. Description of the Related Art

Mobile communication terminals include various functions such as a camera function, a multimedia playing function, etc. in addition to the simple radio communication function. The camera and multimedia playing functions are gradually becoming more popular especially because the terminal is equipped with a digital camera with a high resolution and a color LCD (Liquid Crystal Display) screen.

Further, graphic data such as icons indicating various information (e.g., reception characteristics, a battery capacity, messages, bell/vibration, etc.) and menus are generally displayed on the color LCD. Pictures taken with the camera as well as streaming image data decoded by an MPEG-4 (Motion Picture Experts Group 4) Codec (Coder and Decoder) may also be displayed on the color LCD.

In addition, the mobile terminal digital camera uses a CCD (Charge Coupled Device), a CMOS (Complementary Metal Oxide Semiconductor), etc. as a photographing device, and also includes an AE (Automatic Exposure) function for automatically adjusting an amount of light with respect to images photographed by the digital camera.

A related art mobile terminal method for compensating an automatic exposure of a camera adjusts an aperture opening time of a lens, when an average luminance value of a photographed image goes beyond a range of a particular threshold value. Accordingly, the amount of light for an image to be photographed is controlled so as to display an optimum image. That is, in the related art compensating method, the amount of light for the image being photographed is increased by lengthening the aperture opening time, while the amount of light is decreased by shortening the aperture opening time.

However, in the related compensating method, the time required for compensating the automatic exposure to achieve a particular target luminance value takes too long. Further, the stability for compensating the automatic exposure to achieve the particular target luminance value is degraded.

SUMMARY OF THE INVENTION

Accordingly, one object of the present invention is to address the above-noted and other problems.

Another object of the present invention is to shorten a time required for the automatic exposure compensation method by determining a convergent coefficient value based on a difference value between an average luminance value of a current image frame and a particular target luminance value, and upgrading a weight of an adaptive filter based on the determined convergent coefficient value.

Yet another object of the present invention is to stably compensate the automatic exposure by determining the convergent coefficient value and upgrading the weight of the adaptive filter based on the determined convergent coefficient value.

To achieve these and other advantages and in accordance with one aspect of the present invention, as embodied and broadly described herein, there is provided a mobile communication terminal for compensating an automatic exposure of a camera. The terminal includes a subtracter configured to output a presumptive error value based on an average luminance value of an input current image frame and a target luminance value, a convergent coefficient selector configured to select a convergent coefficient value based on the output presumptive error value, a weight operator configured to determine a weight value of an adaptive filter based on the selected convergent coefficient value, an exposure value of the input current image frame and the output presumptive error value, and an adder configured to output an exposure value, for a next image frame based on the determined weight value, the exposure value of the input current image frame and the output presumptive error value.

In accordance with another aspect of the present invention, there is provided a method for compensating an automatic exposure of a camera in a mobile communication terminal. The method includes determining a presumptive error value based on an average luminance value of an input current image frame and a particular target luminance value, selecting a convergent coefficient value based on the determined presumptive error value, determining a weight value of an adaptive filter based on the selected convergent coefficient value, and determining an exposure value for a next image frame based on the determined weight value, the determined presumptive error value and the exposure value of the current image frame.

In accordance with yet another aspect of the present invention, there is provided a camera including a convergent coefficient selector configured to select a convergent coefficient value based on a presumptive error value that is a difference between an average luminance value of an input current image frame and a particular target luminance value, a weight operator configured to determine a weight value of an adaptive filter based on the selected convergent coefficient value, and an adder configured to determine an exposure value for a next image frame by multiplying the presumptive error value of the current image frame, the exposure value of the current image frame, and the convergent coefficient value, and adding the selected convergent coefficient value to a result of the multiplying.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a detailed description will be provided about a mobile communication terminal and method for compensating an automatic exposure of a camera by which a time for compensating the automatic exposure is shortened and the stability of automatic composure compensation is improved. This is accomplished by determining a convergent coefficient value based on an average luminance value of a current image frame and a particular target luminance value and updating a weight of an adaptive filter based on the determined convergent coefficient value. In addition, the automatic exposure compensation of the present invention can be applied to a mobile device or any other device having a camera.

Figure 1:
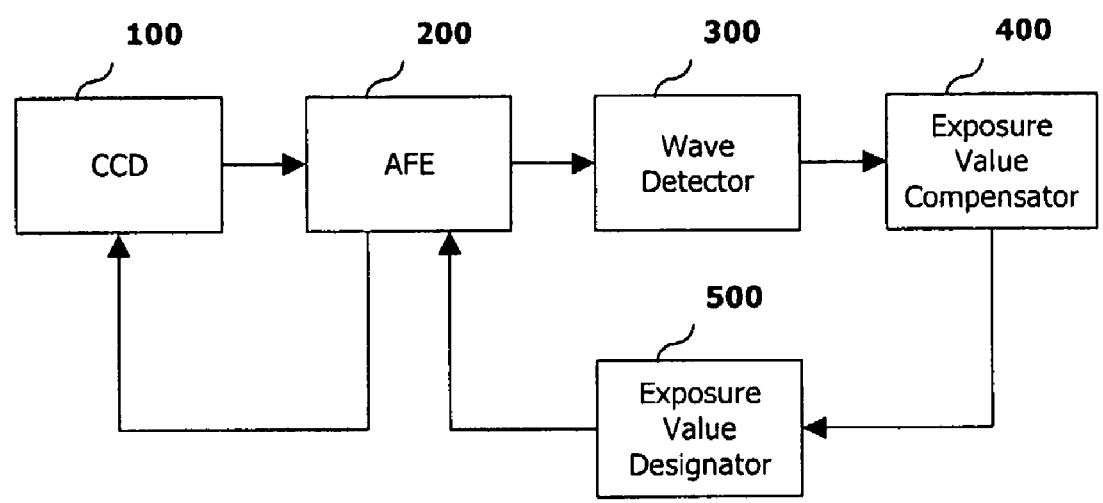
FIG. 1 is a block diagram showing a mobile communication terminal for compensating an automatic exposure of a camera in accordance with an embodiment of the present invention.

Turning first to FIG. 1, which is a block diagram showing a mobile communication terminal for compensating an automatic exposure of a camera in accordance with an embodiment of the present invention. As shown, the mobile terminal includes a CCD (Charge Coupled Device) portion 100 for converting image data photographed through a camera lens into an analog value, an AFE (Analog Front End) portion 200 for converting the output analog image data into a digital image data, a wave detector 300 for detecting a luminance value of the output digital image data, and an exposure value compensator 400 for compensating an exposure value of the digital image data based on the detected luminance value. Also included is an exposure value designator 500 for determining an electronic shutter speed value based on the detected exposure value.

An operational principle of such a configured mobile communication terminal for compensating the automatic exposure of the camera in accordance with an embodiment of the present invention will now be explained in more detail.

First, when a user selects a camera photographing function, the mobile terminal initializes devices such as the CCD portion 100, the AFE portion 200, the wave detector 300, the exposure value compensator 400 and the exposure value designator 500. Further, the CCD portion 100 converts image data photographed through a camera lens into an analog value, and the AFE portion 200 converts the analog image data into digital image data and outputs the converted digital image data.

The wave detector 300 divides the inputted digital image data in frame units. That is, the wave detector 300 divides a current frame into a particular number of regions and detects respective luminance values of the divided regions. The wave detector 300 then multiplies the detected luminance values by a particular weight. Accordingly, an average luminance value of the input current frame is determined based on the luminance values having been multiplied by the weight. The determined average luminance values is then output to the exposure value compensator 400. The exposure value compensator 400 then detects a compensated exposure value of the digital image data based on the output average luminance value and a particular target luminance value.

Figure 2:
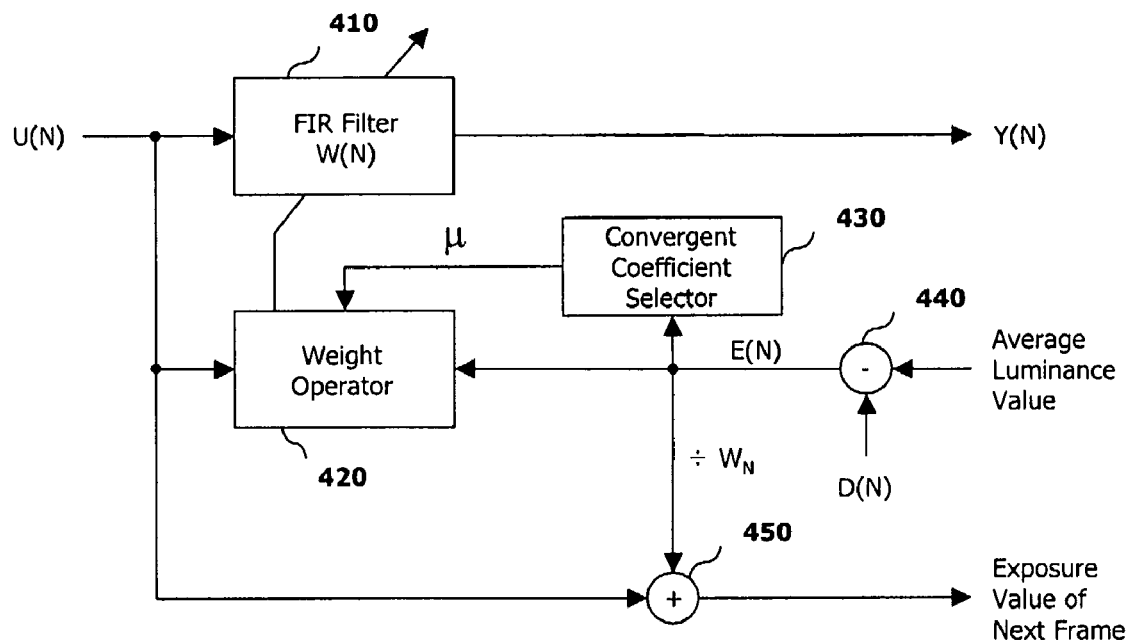
FIG. 2 is a block diagram showing a detailed structure of an automatic exposure compensator shown in FIG. 1.

Turning now to FIG. 2, which is a block diagram showing the structure of the exposure value compensator 400 shown in FIG. 1. As shown, the exposure value compensator 400 includes a subtracter 440 for outputting a presumptive error value, which is a difference value between a target luminance value and an average luminance value of the input current image frame, a convergent coefficient selector 430 for selecting a convergent coefficient value based on the output presumptive error value, and a weight operator 420 for determining a weight value based on the selected convergent coefficient value and an exposure value of the input current image frame and the output presumptive error value.

Also included is an adder 450 for outputting an exposure value of the next image frame based on the determined weight value, the exposure value of the input current image frame and the output presumptive error value. The exposure value compensator 400 is further provided with a FIR (Finite Impulse Response) filter 410 for applying the determined weight value to the exposure value of the input current image frame, and for outputting the exposure value of the current image frame to which the weight value has been applied.

Figure 3:
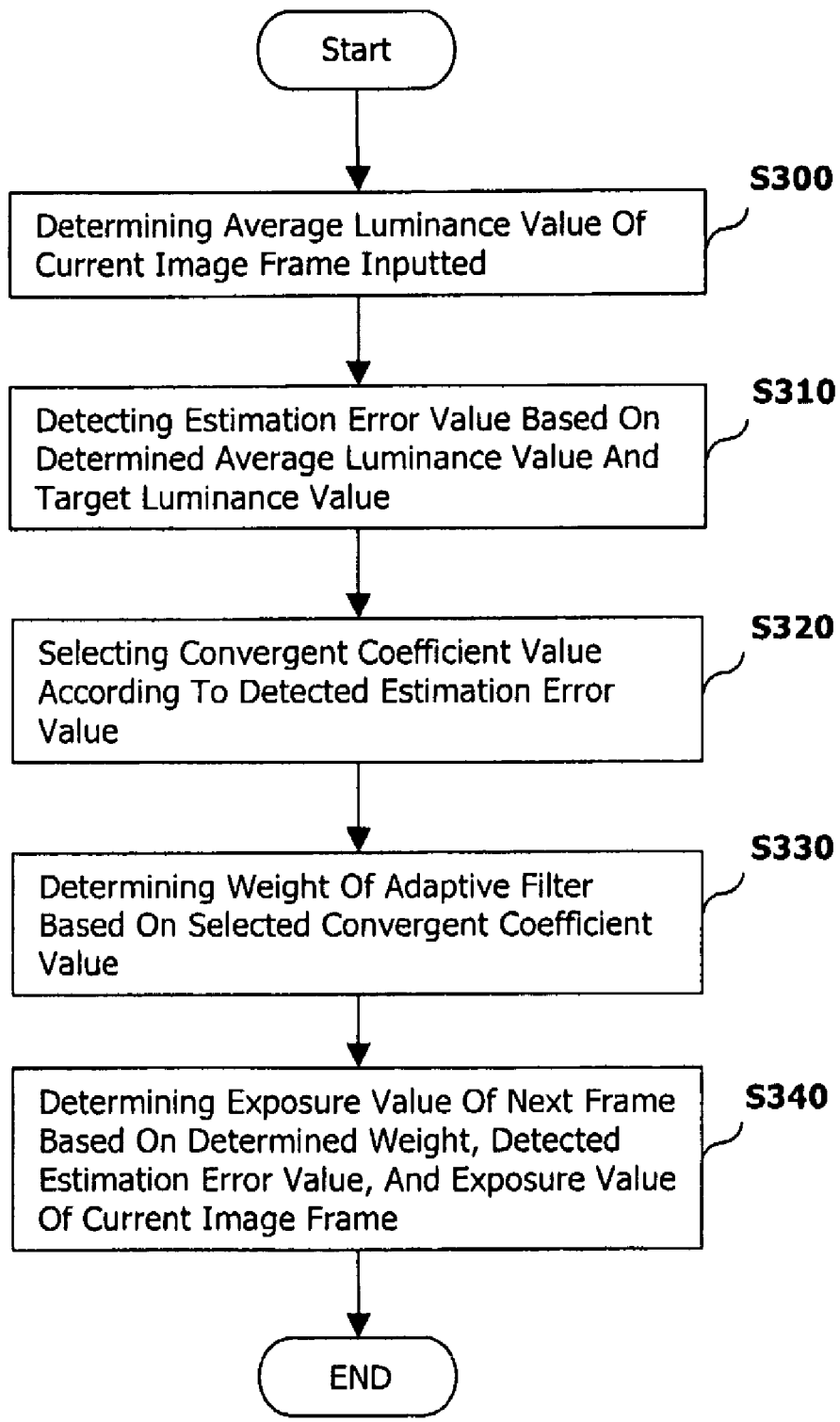
FIG. 3 is a flowchart showing a method for compensating an automatic exposure of the camera disposed in the mobile communication terminal in accordance with the present invention.

Next, FIG. 3 is a flowchart showing a method for compensating the automatic exposure of the camera disposed in the mobile communication terminal in accordance with the present invention. As shown, the method includes determining an average luminance value of an input current image frame (S300), detecting a presumptive error value based on the determined average luminance value and a particular target luminance value (S310), selecting a convergent coefficient value based on the determined presumptive error value (S320), determining a weight value of an adaptive filter based on the determined convergent coefficient value (S330), and determining an exposure value of the next image frame based on the determined weight value, the presumptive error value, and the exposure value of the current image frame (S340).

Now, the method for compensating the automatic exposure of the camera disposed in the mobile communication terminal in accordance with the present invention will be described in more detail with reference to FIGS. 2 and 3.

First, the subtracter 440 determines a difference value between an average luminance value of the input current image frame and a target luminance value D(N), and outputs the difference value as a presumptive error value E(N) (S310). Afterwards, the convergent coefficient selector 430 selects a convergent coefficient value $\mu$ based on the output presumptive error value and outputs the selected convergent coefficient value $\mu$ (S320). Here, the convergent coefficient value $\mu$ refers to a particular value according to the presumptive error value which is experimentally measured. Further, for a greater difference value between the average luminance value of the current image frame and the target luminance value, a relatively larger value is set as the convergent coefficient value to quickly converge the average value to the target luminance value.

In addition, the weight operator 420 determines a weight W(N) value to be applied to the input current frame based on the output convergent coefficient value, the presumptive error value, and the exposure value U(N) of the input current frame so that the adaptive filter 410 can use the weight value based in the determined weight value from the weight operator 20 as shown in the below Equation 1 (S330). Here, the FIR filter is preferably used as the adaptive filter 410.

$$W(N+1) = W(N) + \mu \cdot U(N) \cdot E(N) \quad \text{(Equation 1)}$$

As a result, the adder 450 divides the presumptive error value E(N) by the last weight value $W_N$ among the updated weight values, and adds the divided presumptive error value and the exposure value of the input current image frame so as to output exposure values of the next frame (S340).

In addition, even if an output value of the FIR filter 410 with respect to the exposure value of the current image frame is estimated as the luminance value for the next frame, because an exposure value for the next frame must be estimated, the output value of the FIR filter is not used, but rather only coefficients of the FIR filter 410 are updated by referring to the presumptive error value and the convergent coefficient value.

Next, the exposure value designator 500 (see FIG. 1) designates an electronic shutter speed value of the camera based on the detected exposure value. Thus, in accordance with the present invention, the average luminance value of the current image frame is quickly converged as shown in FIGS. 4A and 4B into the particular target luminance value.

Figure 4A:
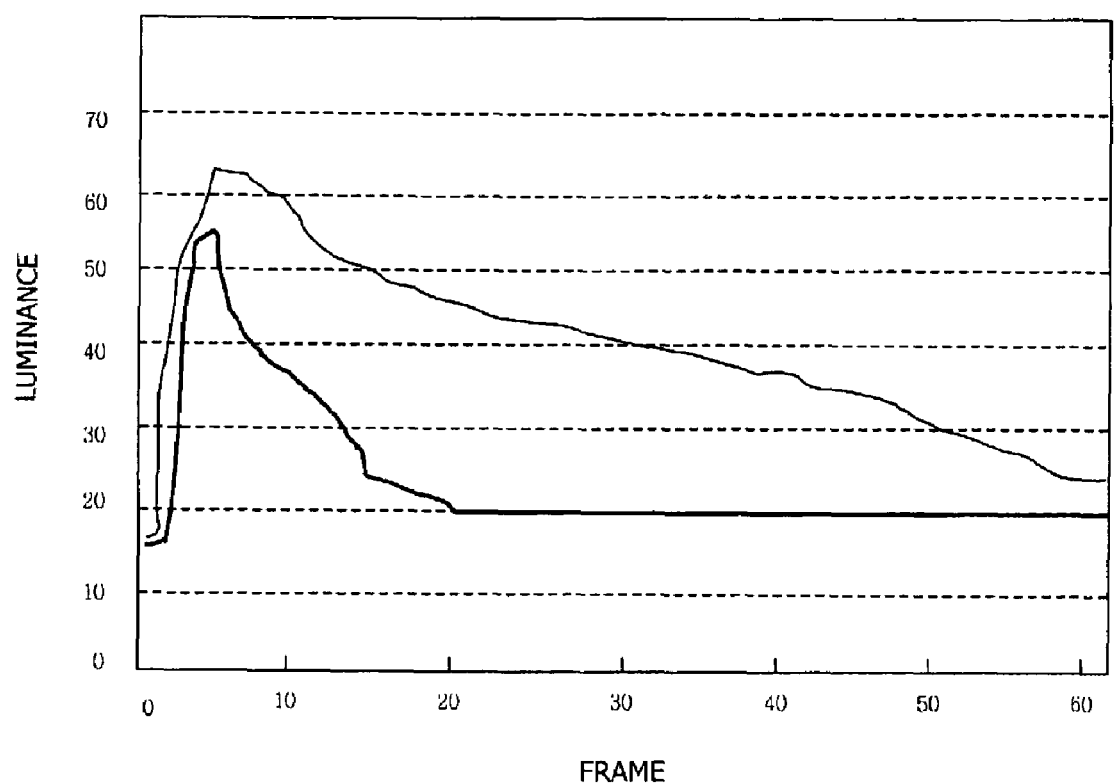
FIGS. 4A and 4B are graphs showing testing results of the method for compensating the automatic exposure of the camera disposed in the mobile communication terminal in accordance with the present invention.
Figure 4B:
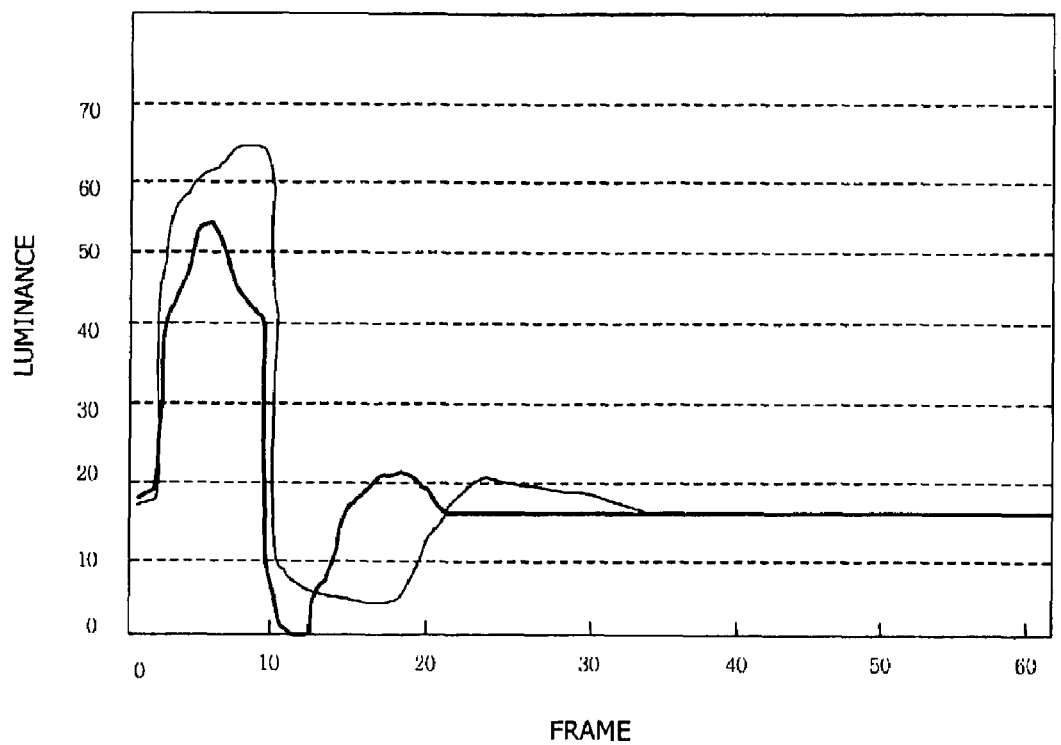

In more detail, FIGS. 4A and 4B are graphs showing testing results of the method for compensating the automatic exposure of the camera in accordance with an embodiment of the present invention. For example, FIG. 4A illustrates an object being photographed in a setting that has a higher luminance than in FIG. 4B. That is, FIG. 4A illustrates an object being photographed outside with more light, and FIG. 4B illustrates an object being photographed inside with less light. As shown in both FIGS. 4A and 4B, the speed at which the average luminance value (thick lines in the graphs) of the input current image frame converges into the particular target luminance value is faster than the speed at which the average luminance value (narrow lines in the graphs) of the current image frame according to the related art converges. Thus, the particular target luminance value can be stably maintained.

As described above, in accordance with the present invention the time for compensating the automatic exposure is effectively shortened by determining the convergent coefficient value according to the difference value between the average luminance value of the current image frame and the particular target luminance value, and updating the weight of the adaptive filter based on the determined convergent coefficient value. The target luminance value is also stably maintained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal for compensating an automatic exposure of a camera, the mobile communication terminal comprising:
   a subtracter configured to output a presumptive error value based on an average luminance value of an input current image frame and a target luminance value;
   a convergent coefficient selector configured to select a convergent coefficient value based on the output presumptive error value;
   a weight operator configured to determine a weight value of an adaptive filter based on the selected convergent coefficient value, an exposure value of the input current image frame and the output presumptive error value; and
   an adder configured to output an exposure value for a next image frame based on the determined weight value, the exposure value of the input current image frame and the output presumptive error value.

2. The terminal of claim 1, wherein the convergent coefficient selector selects one of a plurality of predetermined convergent coefficient values based on the output presumptive error value.

3. The terminal of claim 1, wherein the adaptive filter is a FIR (Finite Impulse Response) filter.

4. A method for compensating an automatic exposure of a camera in a mobile communication terminal, the method comprising:
   determining a presumptive error value based on an average luminance value of an input current image frame and a particular target luminance value;
   selecting a convergent coefficient value based on the determined presumptive error value;
   determining a weight value of an adaptive filter based on the selected convergent coefficient value; and
   determining an exposure value for a next image frame based on the determined weight value, the determined presumptive error value and the exposure value of the current image frame.

5. The method of claim 4, further comprising determining the average luminance value of the input current image frame.

6. The method of claim 5, wherein determining the average luminance value comprises:
   dividing the input current image frame into a plurality of particular regions, and detecting luminance values with respect to the plurality of divided regions;
   multiplying the detected luminance values by a particular weight value; and
   determining the average luminance value of the detected luminance values having been multiplied by the weight value.

7. The method of claim 6, wherein the particular weight value is set differently for each of the plurality of particular regions.

8. The method of claim 4, wherein the presumptive error value is a difference value between the average luminance value and the particular target luminance value.

9. The method of claim 8, wherein the particular target luminance value is a luminance value selected by a user.

10. The method of claim 4, wherein determining the exposure value of the next image frame comprises:
    dividing the presumptive error value by a particular weight value; and
    adding the exposure value of the current image frame to the divided presumptive error value, and determining the exposure value of the current image frame to which the presumptive error value has been added as the exposure value of the next image frame.

11. The method of claim 10, wherein the particular weight value is a weight to be applied to an $N^{th}$ region when dividing the current image frame into N-numbered particular regions.

12. The method of claim 11, wherein the particular weight value has a greatest value among weight values applied to the plurality of particular regions.

13. The method of claim 4, further comprising updating the weight value to be applied to the current image frame based on the presumptive error value and a particular convergent coefficient value.

14. The method of claim 13, wherein the particular convergent coefficient value is a value particular to the presumptive error value.

15. The method of claim 13, wherein when updating the weight value, the weight value to be updated is obtained by
W(N+1)=W(N)+µ·U(N)·E(N), where W(N) refers to the weight value applied to the current image frame, µ refers to the convergent coefficient value, U(N) refers to the exposure value of the current image frame, and E(N) refers to the presumptive error value.

16. A camera, comprising:

a convergent coefficient selector configured to select a convergent coefficient value based on a presumptive error value that is a difference between an average luminance value of an input current image frame and a particular target luminance value;

a weight operator configured to determine a weight value of an adaptive filter based on the selected convergent coefficient value; and an adder configured to determine an exposure value for a next image frame by multiplying the presumptive error value of the current image frame, the exposure value of the current image frame, and the convergent coefficient value, and adding the selected convergent coefficient value to a result of the multiplying.

17. The camera of claim 16, further comprising a wave detector configured to determine the average luminance value of the input current image frame.

18. The camera of claim 17, wherein the wave detector determines the average luminance value by dividing the input current image frame into a plurality of particular regions, and detecting luminance values with respect to the plurality of divided regions, multiplying the detected luminance values by a particular weight value, and determining the average luminance value of the detected luminance values having been multiplied by the weight value.

19. The camera of claim 18, wherein the particular weight value is set differently for each of the plurality of particular regions.

20. The camera of claim 16, wherein the particular target luminance value is a luminance value selected by a user.

* * * * *